US 9,868,042 B1

(12) United States Patent
    Leonard (10) Patent No.:     US 9,868,042 B1
(45) Date of Patent:     Jan. 16, 2018

(54) BATON STAND (71) Applicant: Hugh Lee Leonard, Orlando, FL (US)

(72) Inventor: Hugh Lee Leonard, Orlando, FL (US)

( * ) Notice: Subject to any disclaimer, the term of this patent is extended or adjusted under 35 U.S.C. 154(b) by 0 days.

(21) Appl. No.: 15/426,531

(22) Filed: Feb. 7, 2017

(51) Int. Cl.
    A63K 3/00      (2006.01)
    B66F 3/36      (2006.01)
    B66F 1/00      (2006.01)
    B66F 3/00      (2006.01)
    A63B 69/00     (2006.01)
    G09B 19/00     (2006.01)
    F16M 11/28     (2006.01)
    F16B 7/10      (2006.01)
    F16M 11/10     (2006.01)
    F16M 11/04     (2006.01)
    F16B 7/14      (2006.01)

(52) U.S. Cl.
    CPC ............ *A63B 69/0028* (2013.01); *A63K 3/00* (2013.01); *F16B 7/105* (2013.01); *F16B 7/14* (2013.01); *F16B 7/1418* (2013.01); *F16B 7/1427* (2013.01); *F16M 11/041* (2013.01); *F16M 11/10* (2013.01); *F16M 11/28* (2013.01); *G09B 19/0038* (2013.01); *A63B 2225/093* (2013.01); *A63B 2244/00* (2013.01)

(58) Field of Classification Search
    CPC ......... A63B 69/0028; A63K 3/00; A63K 3/02
    USPC ........... 269/269; 482/14; 254/134, 100, 102, 254/198
    See application file for complete search history.

(56) References Cited

U.S. PATENT DOCUMENTS

| 3,926,393 | A |   | 12/1975 | Tainsh |              |
|-----------|---|---|---------|--------|--------------|
| 4,149,724 | A |   | 4/1979  | Walsh  |              |
| 4,671,479 | A | * | 6/1987  | Johnson | F16M 11/16  |
|           |   |   |         |        | 248/173      |
| D337,593  | S | * | 7/1993  | Hewitt | D15/141      |
| 5,337,875 | A | * | 8/1994  | Lee    | B65G 13/12   |
|           |   |   |         |        | 193/35 C     |
| 5,522,300 | A | * | 6/1996  | Cheatwood | G10D 13/003 |
|           |   |   |         |        | 206/314      |
| 5,855,286 | A |   | 1/1999  | Laid   |              |
| 5,934,628 | A | * | 8/1999  | Bosnakovic | B60Q 7/00 |
|           |   |   |         |        | 248/169      |
| D423,036  | S | * | 4/2000  | Lombardi | D17/22     |
| 6,150,595 | A |   | 11/2000 | Vaglica |             |
| 6,412,737 | B1 | * | 7/2002 | Minagawa | F16B 7/14  |
|           |   |   |         |        | 248/125.8    |

(Continued)

FOREIGN PATENT DOCUMENTS

WO         2005091270 A2    9/2005

*Primary Examiner* — Nyca T Nguyen
(74) *Attorney, Agent, or Firm* — Kyle A. Fletcher, Esq.

(57) ABSTRACT

The baton stand is a training device that is configured for use with a baton that is used in the relay race events of a track and field competition. The baton stand is a container within which a baton can be placed or removed as a runner passes by the baton stand. The baton stand is adjustable such that the baton stand will simulate the angle and height the baton should be in during the acceptance or hand off of the baton. To use the baton stand, a runner runs past the baton stand and, depending on the objective of the training exercise, will place the baton into or remove the baton from the baton stand. The baton stand comprises a telescopic stanchion, a stand, a basket, and a locking hinge. The stand attaches to the telescopic stanchion. The locking hinge attaches the basket to the telescopic stanchion.

10 Claims, 6 Drawing Sheets

(56) References Cited

U.S. PATENT DOCUMENTS

| | | | |
|---|---|---|---|
| 8,646,731 B2* | 2/2014 | Burles | F16L 3/16 |
| | | | 144/287 |
| 9,126,094 B1* | 9/2015 | Davis | G07C 1/24 |
| 2005/0218275 A1* | 10/2005 | Keating | B25H 1/00 |
| | | | 248/176.1 |
| 2006/0062632 A1* | 3/2006 | Jang | E04H 15/46 |
| | | | 403/109.6 |
| 2007/0252067 A1* | 11/2007 | Lee | F16B 7/105 |
| | | | 248/407 |
| 2008/0106018 A1* | 5/2008 | Bellavance | B23K 37/0533 |
| | | | 269/57 |

* cited by examiner

COTTER PIN

FIG. 6

SPRING LOADED
BALL LOCK

FIG. 7

G SNAP COLLAR

FIG. 8

SPLIT COLLAR LOCK

FIG. 9

THREADED CLUTCH

FIG. 10

INTERNAL CAM LOCK

FIG. 11

BATON STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of human necessities including sports, games, and amusements, more specifically, a racing sport accessory not otherwise provided for.

SUMMARY OF INVENTION

The baton stand is a training device. The baton stand is configured for use with a baton that is used in the relay race events of a track and field competition. The baton stand is a container within which a baton can be placed or removed as a runner passes by the baton stand. The baton stand is adjustable such that the baton stand will simulate the angle and height the baton should be in during the acceptance or hand off of the baton. To use the baton stand, a runner runs past the baton stand and, depending on the objective of the training exercise, will place the baton into or remove the baton from the baton stand. The baton stand comprises a telescopic stanchion, a stand, a basket, and a locking hinge. The stand attaches to the telescopic stanchion. The locking hinge attaches the basket to the telescopic stanchion.

These together with additional objects, features and advantages of the baton stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the baton stand in detail, it is to be understood that the baton stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the baton stand.

It is therefore important that the claims be regarded as including such equivalent construction insofar as they do not depart from the spirit and scope of the baton stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
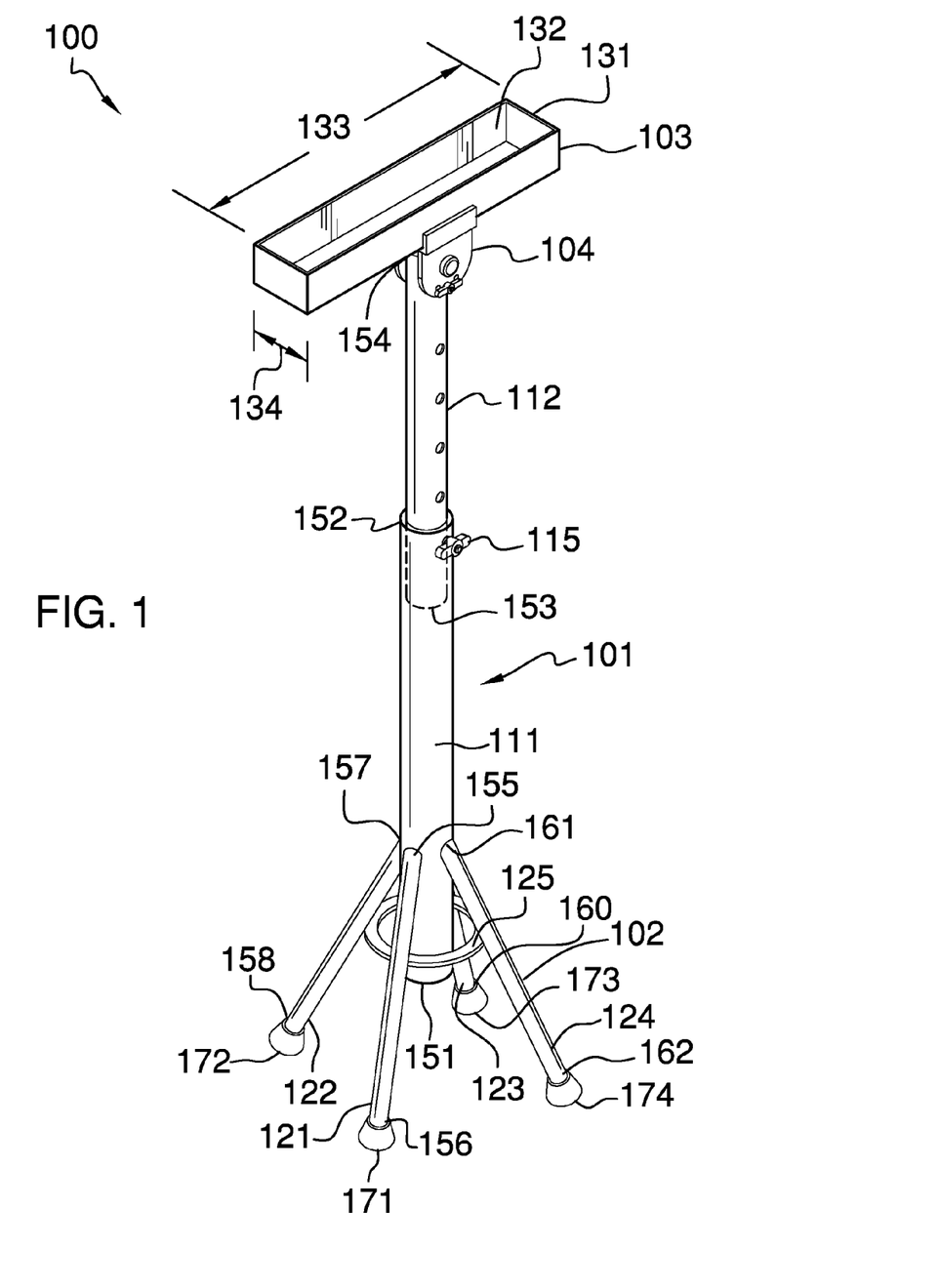
FIG. 1 is a perspective view of an embodiment of the disclosure.
Figure 2:
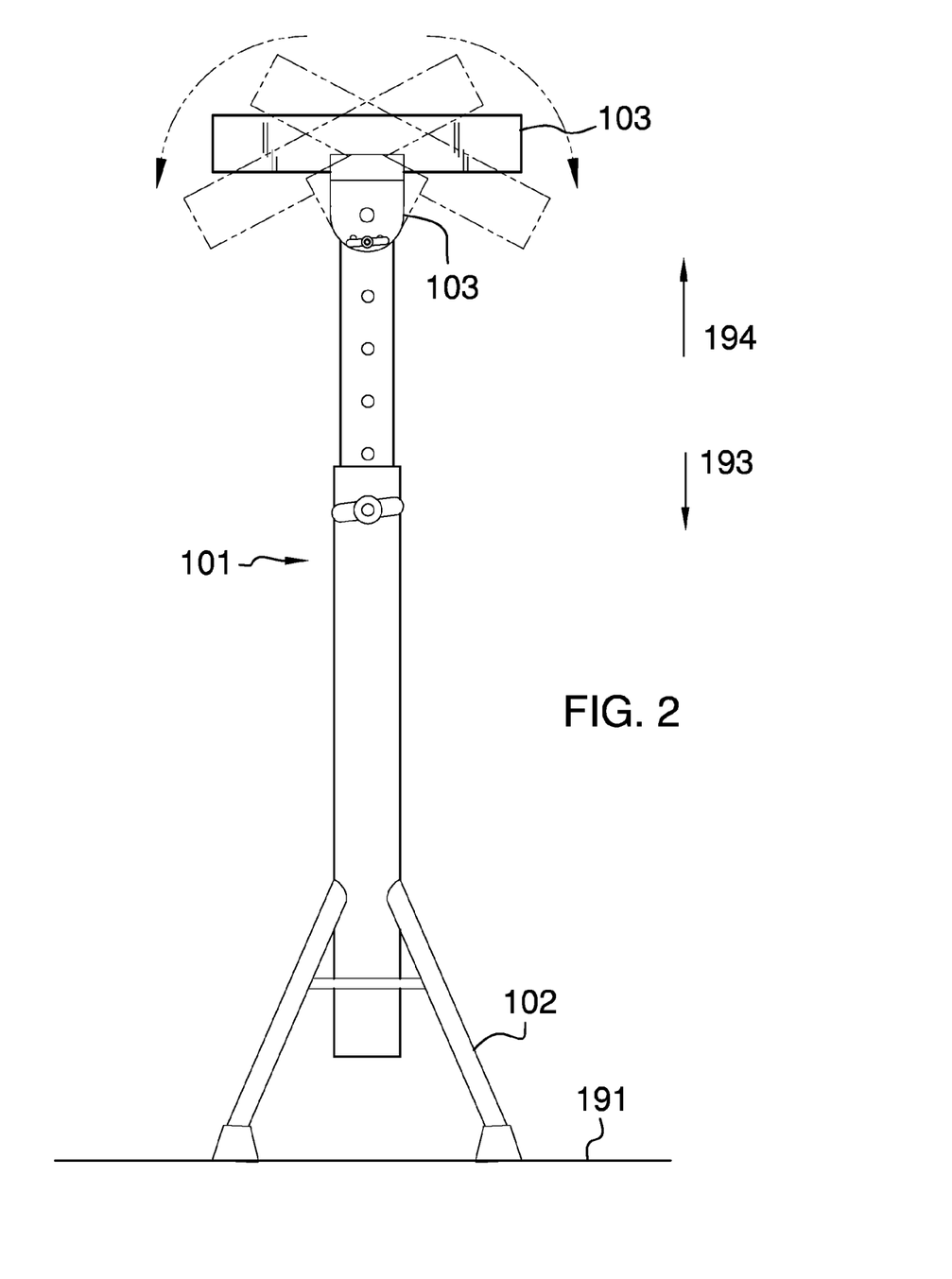
FIG. 2 is a side view of an embodiment of the disclosure.
Figure 3:
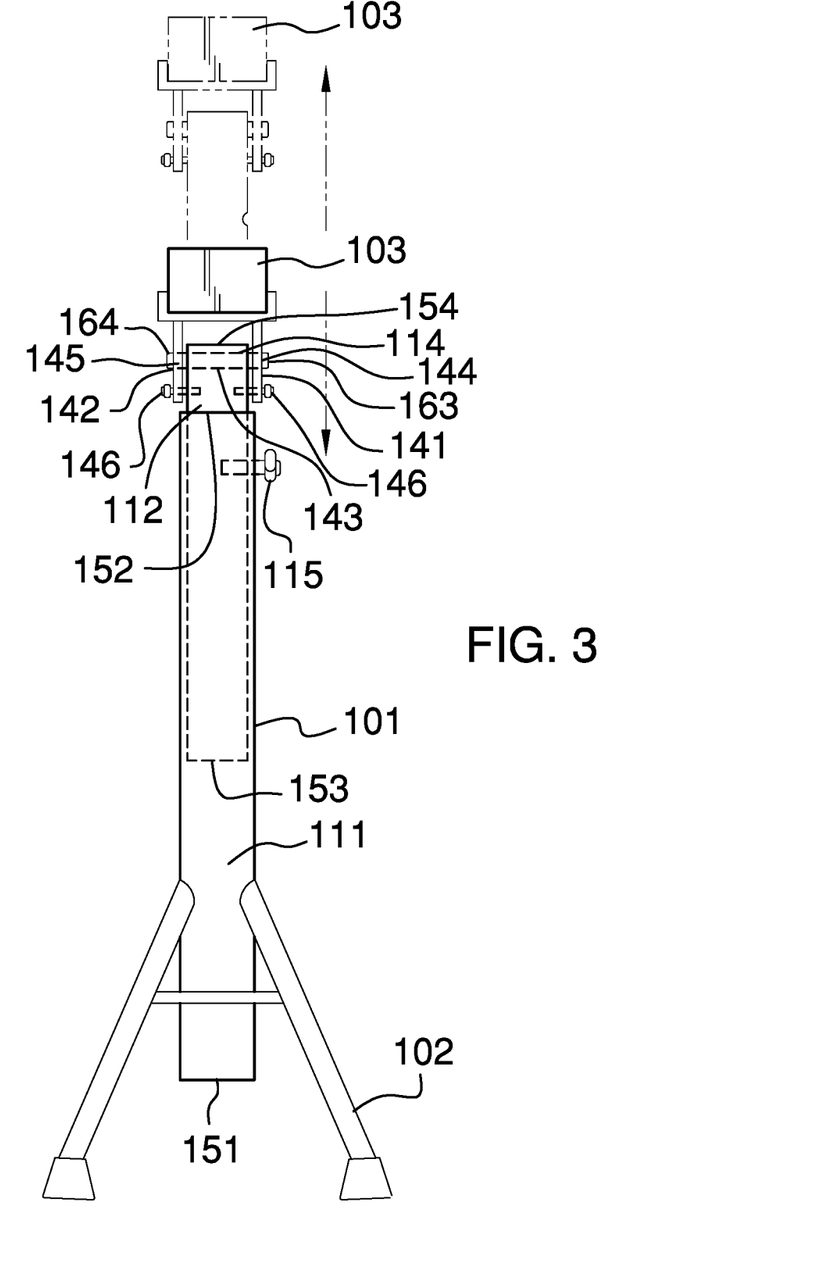
FIG. 3 is a front view of an embodiment of the disclosure.
Figure 4:
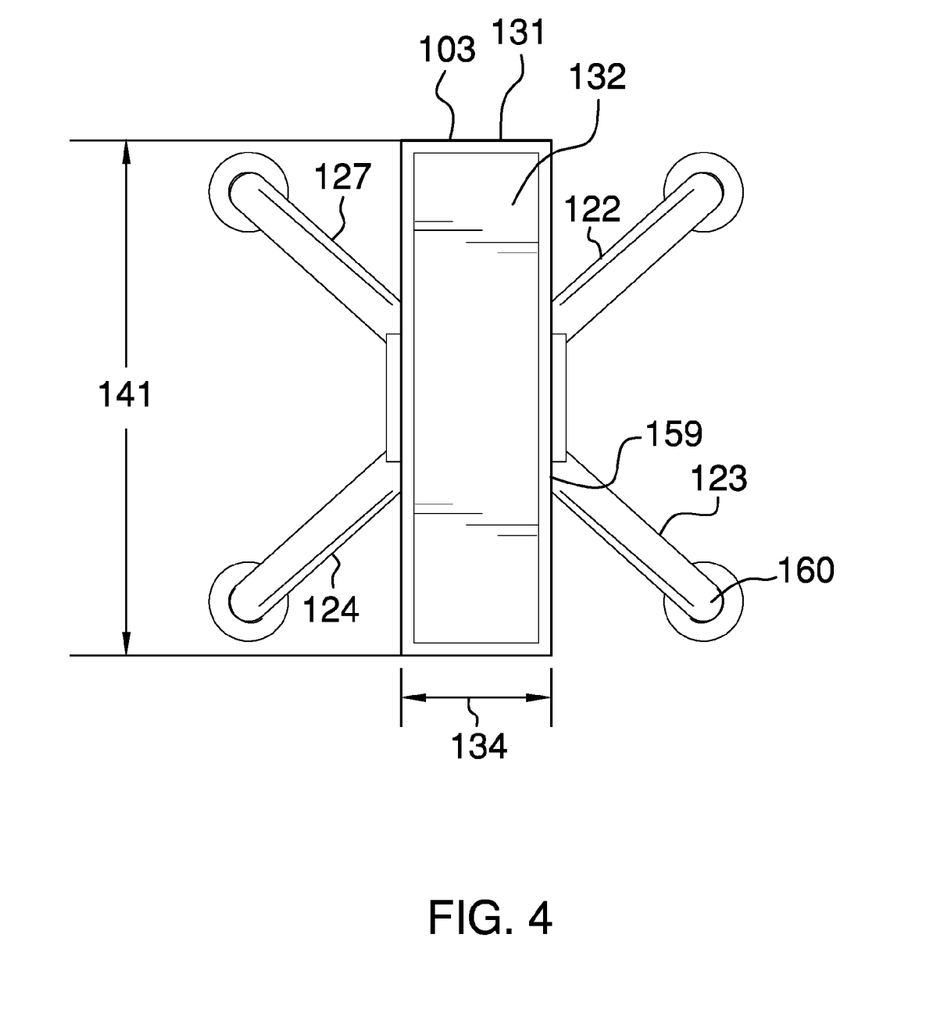
FIG. 4 is a top view of an embodiment of the disclosure.
Figure 5:
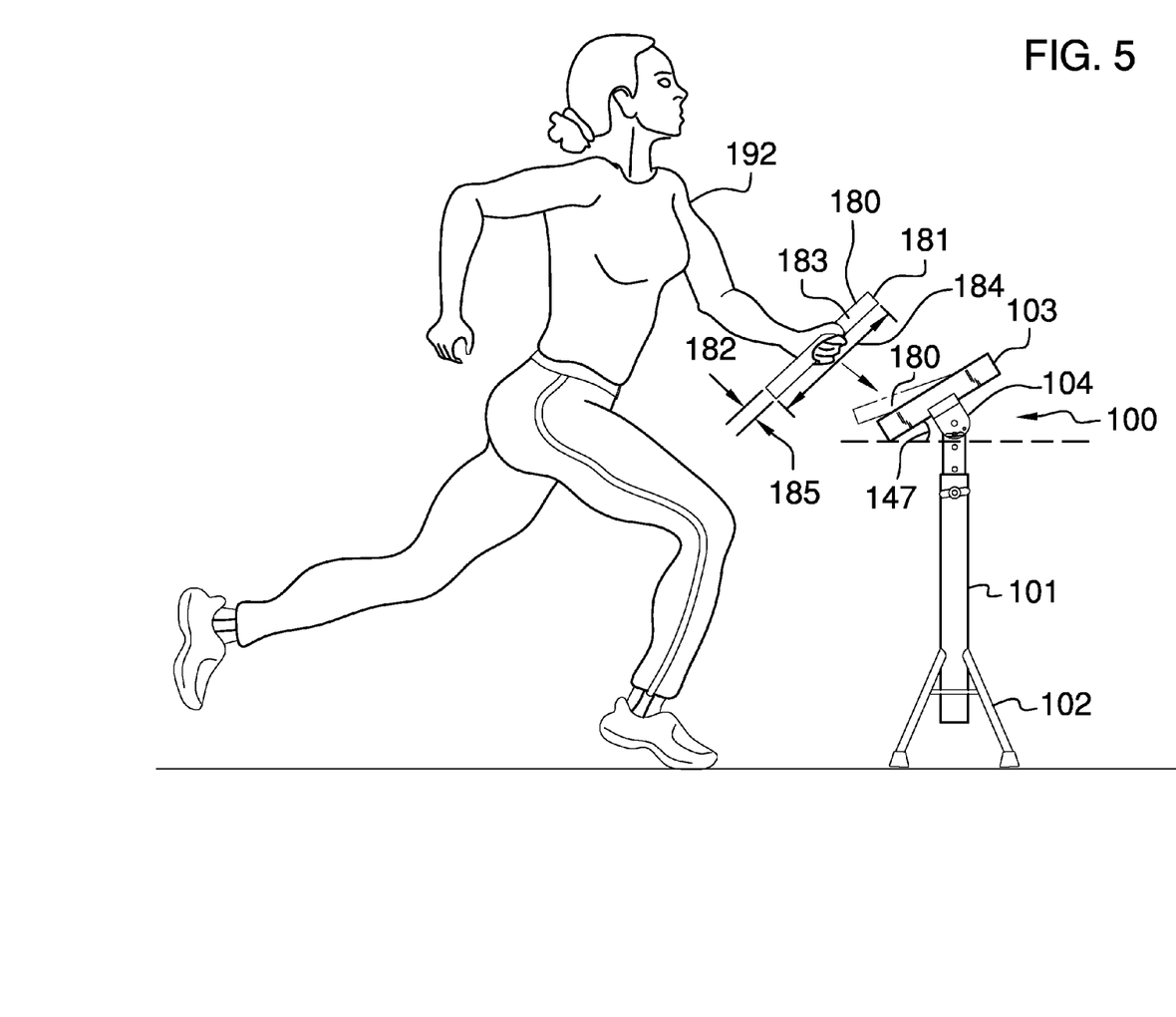
FIG. 5 is an in use view of an embodiment of the disclosure.
Figure 6:
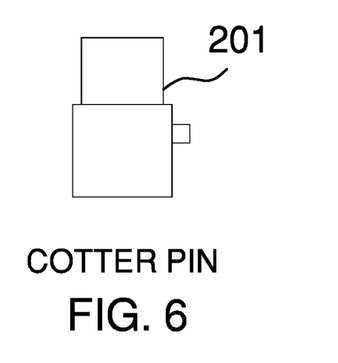
FIG. 6 is a detail view of an embodiment of the disclosure.
Figure 7:
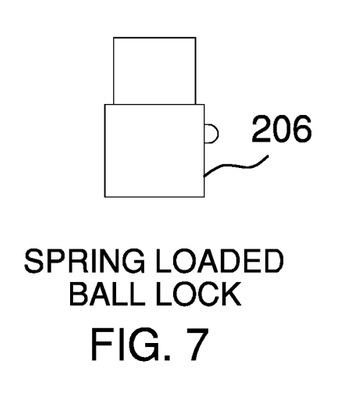
FIG. 7 is a detail view of an embodiment of the disclosure.
Figure 8:
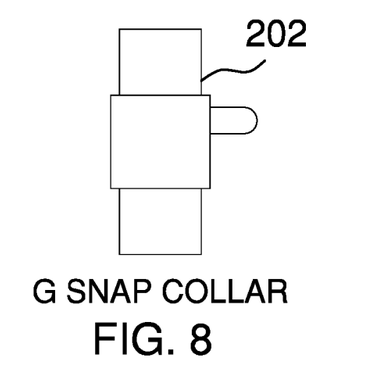
FIG. 8 is a detail view of an embodiment of the disclosure.
Figure 9:
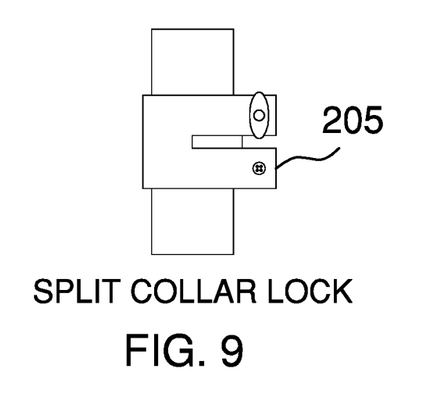
FIG. 9 is a detail view of an embodiment of the disclosure.
Figure 10:
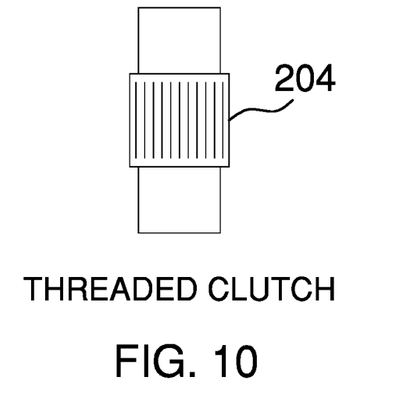
FIG. 10 is a detail view of an embodiment of the disclosure.
Figure 11:
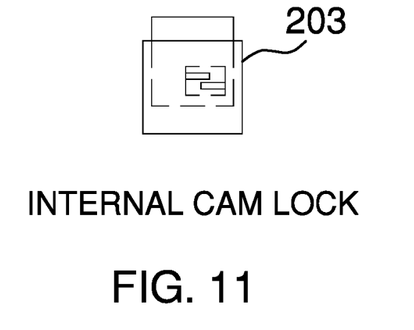
FIG. 11 is a detail view of an embodiment of the disclosure.

Detailed reference will now be made to one or more potential embodiments of the disclosure, which are illustrated in FIGS. 1 through 11.

The baton stand 100 (hereinafter invention) is a training device. The invention 100 is configured for use with a baton 180 that is used in the relay race events of a track and field competition. The invention 100 is a container within which a baton 180 can be placed or removed as a runner 192 passes by the invention 100. The runner 192 is assumed to be the person using the invention 100. The invention 100 is adjustable such that the invention 100 will simulate the angle and height the baton 180 should be in during the acceptance or hand off of the baton 180. To use the invention 100, a runner 192 runs past the invention 100 and, depending on the objective of the training exercise, will place the baton 180 into or remove the baton 180 from the invention 100. The invention 100 comprises a telescopic stanchion 101, a stand 102, a basket 103, and a locking hinge 104. The stand 102 attaches to the telescopic stanchion 101. The locking hinge 104 attaches the basket 103 to the telescopic stanchion 101. The invention 100 is assumed to be placed on a supporting surface 191 during use. The supporting surface 191 is a horizontal surface.

The baton 180 itself is a cylindrical pipe that is carried by a runner 192 during a relay race. The baton 180 is further defined with a first baton end 181, a second baton end 182, a cylindrical face 183, a baton length 184, and a baton diameter 185. The first baton end 181, the second baton end 182, and the cylindrical face 183 respectively correspond to the first base, the second base, and the face of a cylinder. The baton length 184 is the span of the center axis of the cylindrical structure that forms the baton 180. The baton diameter 185 is a measure of the outer diameter of the baton 180.

The telescopic stanchion 101 is a vertical structure that raises the basket 103 above the supporting surface 191. The vertical span of the telescopic stanchion 101 is adjustable. The telescopic stanchion 101 further comprises a first arm 111, a second arm 112, a radial hole 114, and a detent 115. The first arm 111 is further defined with a first end 151 and a second end 152. The second arm 112 is further defined with a third end 153 and a fourth end 154. The detent 115 connects the second arm 112 to the first arm 111. The radial hole 114 attaches the telescopic stanchion 101 to the locking hinge 104.

The first arm 111 is a hollow first structure that is further defined with an inner diameter. The second arm 112 is a second structure that is further defined with an outer diameter. The outer diameter of the second arm 112 is less than the inner diameter of the first arm 111 such that the third end 153 of the second arm 112 can be inserted into the second end 152 of the first arm 111 in a telescopic manner. This telescopic arrangement of the telescopic stanchion 101 allows the length of the telescopic stanchion 101 to be adjusted by adjusting the relative position of the third end 153 of the second arm 112 within the first arm 111. The position of the second arm 112 relative to the first arm 111 is held in position using the detent 115. The detent 115 is a mechanical device that connects and secures the first arm 111 to the second arm 112. As shown most clearly in FIG. 6 through 11, the detent 115 is selected from the group consisting of a cotter pin 201, a G snap collar 202, a cam lock collar 203, a threaded clutch 204, a split collar lock 205, or a spring loaded ball lock 206.

The first arm 111 is a readily and commercially available perforated pipe. In the first potential embodiment of the disclosure, the first arm 111 is a cylindrical pipe. The second arm 112 is a readily and commercially available perforated pipe. In the first potential embodiment of the disclosure, the second arm 112 is a cylindrical pipe.

The radial hole 114 is a radial hole 114 that is formed in the vicinity of the fourth end 154 of the second arm 112.

The detent 115 is a commercially available device that holds the first arm 111 in a position that is fixed relative to the second arm 112. In the first potential embodiment of the disclosure, as shown most clearly in FIG. 1, the detent 115 is a cotter pin 201 that is simultaneously inserted through: 1) one or more perforations contained within the first arm 111; and, 2) one or more perforations contained within the second arm 112.

The stand 102 is a structure that supports the telescopic stanchion 101 such that the center axis of the telescopic stanchion 101 will project perpendicularly away from the supporting surface 191 when the invention 100 is positioned for use.

The stand 102 comprises a first strut 121, a second strut 122, a third strut 123, a fourth strut 124, and a retaining ring 125. The first strut 121 is further defined with a fifth end 155 and a sixth end 156. The second strut 122 is further defined with a seventh end 157 and an eighth end 158. The third strut 123 is further defined with a ninth end 159 and a tenth end 160. The fourth strut 124 is further defined with an eleventh end 161 and a twelfth end 162.

The stand 102 attaches to the first arm 111 of the telescopic stanchion 101 such that the sixth end 156 of the first strut 121, the eighth end 158 of the second strut 122, the tenth end 160 of the third strut 123 and the twelfth end 162 of the fourth strut 124 all extend beyond the first end 151 of the first arm 111 in the inferior 193 direction. The stand 102 is formed such that when the sixth end 156 of the first strut 121, the eighth end 158 of the second strut 122, the tenth end 160 of the third strut 123, and the twelfth end 162 of the fourth strut 124 are placed on a supporting surface 191 then the center axis of the telescopic stanchion 101 will project perpendicularly away from the supporting surface 191 in the superior 194 direction.

The first strut 121 is a readily and commercially available pipe. In the first potential embodiment of the disclosure, the first strut 121 is a cylindrical pipe. The second strut 122 is a readily and commercially available pipe. In the first potential embodiment of the disclosure, the second strut 122 is a cylindrical pipe. The third strut 123 is a readily and commercially available pipe. In the first potential embodiment of the disclosure, the third strut 123 is a cylindrical pipe. The fourth strut 124 is a readily and commercially available pipe. In the first potential embodiment of the disclosure, the fourth strut 124 is a cylindrical pipe.

In the first potential embodiment of the disclosure, the first strut 121 further comprises a first end cap 171. The second strut 122 further comprises a second end cap 172. The third strut 123 further comprises a third end cap 173. The fourth strut 124 further comprises a fourth end cap 174. The first end cap 171 is a readily and commercially available end cap that is often used with a chair to prevent the chair from scratching a floor. The second end cap 172 is a readily and commercially available end cap that is often used with a chair to prevent the chair from scratching a floor. The third end cap 173 is a readily and commercially available end cap that is often used with a chair to prevent the chair from scratching a floor. The fourth end cap 174 is a readily and commercially available end cap that is often used with a chair to prevent the chair from scratching a floor.

The retaining ring 125 is a commercially available ring structure. The inner diameter of the retaining ring 125 is greater than the outer diameter of the first arm 111 such that the first arm 111 can be inserted through the retaining ring 125.

The basket 103 is a container into and from which the baton 180 is placed or removed during training periods. The basket 103 comprises a rectangular container 131. The rectangular container 131 a hollow rectangular block structure that is further defined with an open face 132, a basket length 133, and a basket width 134. The open face 132 is a face of the rectangular container 131 that is not covered with a solid surface. The baton 180 is placed into and removed from the basket 103 through the open face 132. The open face 132 is the superior 194 face of the rectangular container 131.

The basket length 133 is the span of the rectangular container 131 that is in a direction that is parallel to the center axis of the baton 180 when the baton 180 is properly placed within the rectangular container 131. The basket width 134 is the span of the rectangular container 131 that is in a direction that is 1) perpendicular to the direction of the basket length 133; and, 2) that is perpendicular to the center axis of the telescopic stanchion 101 when the basket angle 147 is zero. The basket angle 147 is discussed in more detail elsewhere in this disclosure. The span of the basket width 134 is greater than the baton diameter 185.

The locking hinge 104 is a commercially available fastening device that attaches the basket 103 to the telescopic stanchion 101. The locking hinge 104 is a rotatable device. The locking hinge 104 comprises a first flange 141, a second flange 142, a pivot shaft 143, a first hole 144, a second hole 145, and a locking mechanism 146. The locking hinge 104 is further defined with a basket angle 147. The basket angle 147 is an angular measure of the cant that is formed between the inferior 193 surface of the rectangular container 131 and the supporting surface 191. The basket angle 147 is zero when the inferior 193 surface of the rectangular container 131 is parallel to the supporting surface 191. The basket angle 147 is adjusted by the locking hinge 104. The pivot shaft 143 is further defined with a thirteenth end 163 and a fourteenth end 164.

The first flange 141 is a commercially available plate. The second flange 142 is a commercially available plate. The pivot shaft 143 is a commercially available cylindrical shaft. The first hole 144 is a circular hole that is formed within the first flange 141. The second hole 145 is a circular hole that is formed within the second flange 142. The locking mechanism 146 is a commercially available device that prevents the rotation of the locking hinge 104 around the pivot shaft 143.

The assembly and operation of the locking hinge 104 are described the following four paragraphs.

The locking hinge 104 attaches the basket 103 to the fourth end 154 of the second arm 112 of the telescopic stanchion 101. As shown most clearly in FIGS. 2 and 3, the first flange 141 attaches to the face of the rectangular container 131 that is distal to the open face 132 of the rectangular container 131. The second flange 142 attaches to the face of the rectangular container 131 that is distal to the open face 132 of the rectangular container 131. The first flange 141 projects perpendicularly away from the rectangular container 131 in the inferior 193 direction. The second flange 142 projects perpendicularly away from the rectangular container 131 in the inferior 193 direction. The span between the interior surface (after assembly of the locking hinge 104) of the first flange 141 and the interior surface of the second flange 142 is sized such that the second arm 112 can be inserted into the space between the first flange 141 and the second flange 142. Commercially available hardware attaches the first flange 141 and the second flange 142 to the basket 103.

The locking hinge 104 attaches to the fourth end 154 of the second arm 112 as described in this paragraph. The second arm 112 is inserted between the first flange 141 and the second flange 142 of the locking hinge 104 such that the center axis of the radial hole 114 of the second arm 112 is aligned with the center of the first hole 144 of the first flange 141 and the center of the second hole 145 of the second flange 142. The pivot shaft 143 is simultaneously inserted through the first hole 144, the radial hole 114 and the second hole 145 such that: 1) the center axis of the pivot shaft 143 is aligned with the center axis of the radial hole 114; 2) the thirteenth end 163 of the pivot shaft 143 is proximal to the first hole 144; and, 3) the fourteenth end 164 of the pivot shaft 143 is proximal to the first hole 144.

With this arrangement, the locking hinge 104 will rotate around the pivot shaft 143 such that the center axis of the radial hole 114 forms the center of rotation. The attachment of the basket 103 to the locking hinge 104 means that the rotation of the locking hinge 104 will further rotate the basket 103.

The rotation of the locking hinge 104 around the pivot shaft 143 allows for the adjustment of the basket angle 147.

When the basket angle 147 is in the proper position, the basket angle 147 is locked into position using the locking mechanism 146. The locking mechanism 146 is a commercially available device that "locks" the locking hinge 104 by temporarily preventing the rotation of the locking hinge 104. By temporary is meant that the locking hinge 104 can be subsequently "unlocked" such that the locking hinge 104 is again able to rotate around the pivot shaft 143. Devices that perform the functions of the locking hinge 104 are commercially available and are often marketed as a "locking pivot," a "locking hinge", or a "locking bracket."

The stand 102 is assembled as described in this paragraph and the following two paragraphs. The fifth end 155 of the first strut 121 attaches to the first arm 111 of the telescopic stanchion 101. The seventh end 157 of the second strut 122 attaches to the first arm 111 of the telescopic stanchion 101. The ninth end 159 of the third strut 123 attaches to the first arm 111 of the telescopic stanchion 101. The eleventh end 161 of the fourth strut 124 attaches to the first arm 111 of the telescopic stanchion 101. Methods to make the attachments described in this paragraph are well known in the mechanical arts.

The first strut 121, the second strut 122, the third strut 123, and the fourth strut 124 are reinforced using the retaining ring 125. The face of the first strut 121 attaches to the exterior of the retaining ring 125 in a manner fixes the position of the first strut 121 relative to the position of the remaining struts within the stand 102. The face of the second strut 122 attaches to the exterior of the retaining ring 125 in a manner fixes the position of the second strut 122 relative to the position of the remaining struts within the stand 102. The face of the third strut 123 attaches to the exterior of the retaining ring 125 in a manner fixes the position of the third strut 123 relative to the position of the remaining struts within the stand 102. The face of the fourth strut 124 attaches to the exterior of the retaining ring 125 in a manner fixes the position of the fourth strut 124 relative to the position of the remaining struts within the stand 102. Methods to make the attachments described in this paragraph are well known in the mechanical arts.

In the first potential embodiment of the disclosure, the first end cap 171 is placed over the sixth end 156 of the first strut 121 for the purpose of protecting the supporting surface 191. The second end cap 172 is placed over the eighth end 158 of the second strut 122 for the purpose of protecting the supporting surface 191. The third end cap 173 is placed over the tenth end 160 of the third strut 123 for the purpose of protecting the supporting surface 191. The fourth end cap 174 is placed over the twelfth end 162 of the fourth strut 124 for the purpose of protecting the supporting surface 191.

The following definitions were used in this disclosure:

Align: As used in this disclosure, align refers to an arrangement of objects that are: 1) arranged in a straight line; or, 2) arranged to give a directional sense of a plurality of parallel lines.

Cant: As used in this disclosure, a cant is an angular deviation from one or more reference planes such as a vertical plane or a horizontal plane.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is referred to as an axis of rotation.

Cotter Pin: As used in this disclosure, a cotter pin is a metal shaft that is used to hold two mechanical components together.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Detent: As used in this disclosure, a detent is a device for positioning and holding one mechanical part in relation to another in a manner such that the device can be released by force applied to one or more of the parts.

Diameter: As used in this disclosure, a diameter of an object is a straight line segment that passes through the center of an object. The line segment of the diameter is terminated at the perimeter or boundary of the object through which the line segment of the diameter runs.

Exterior: As used in this disclosure, the exterior is use as a relational term that implies that an object is not contained within the boundary of a structure or a space.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Inner Diameter: As used in this disclosure, the term inner diameter is used in the same way that a plumber would refer to the inner diameter of a pipe.

Interior: As used in this disclosure, the interior is use as a relational term that implies that an object is contained within the boundary of a structure or a space.

Outer Diameter: As used in this disclosure, the term outer diameter is used in the same way that a plumber would refer to the outer diameter of a pipe.

Pivot: As used in this disclosure, a pivot is a rod or shaft around which an object rotates or swings.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe, or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Ring: As used in this disclosure, a ring is term that is used to describe a flat or plate like structure through which an aperture is formed.

Superior: As used in this disclosure, the term superior refers to a directional reference that is parallel to and in the opposite direction of the force of gravity.

Telescopic: As used in this disclosure, telescopic is an adjective that describes an object made of sections that fit or slide into each other such that the object can be made longer or shorter by adjusting the relative positions of the sections.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A training device comprising:
a telescopic stanchion, a stand, a basket, and a locking hinge;
wherein the stand attaches to the telescopic stanchion;
wherein the locking hinge attaches the basket to the telescopic stanchion;
wherein the training device is configured for use with a baton;
wherein the training device is a container within which the baton is placed and removed;
wherein the training device is adjustable;
wherein the training device is placed on a supporting surface during use;
wherein the supporting surface is a horizontal surface;
wherein the baton itself is a cylindrical pipe;
wherein the baton is further defined with a first baton end, a second baton end, a cylindrical face, a baton length, and a baton diameter;
wherein the telescopic stanchion is a vertical structure;
wherein the vertical span of the telescopic stanchion is adjustable;
wherein the telescopic stanchion further comprises a first arm, a second arm, a radial hole, and a detent;
wherein the first arm is further defined with a first end and a second end;
wherein the second arm is further defined with a third end and a fourth end;
wherein the detent connects to the first arm and the second arm;
wherein the radial hole attaches the telescopic stanchion to the locking hinge;
wherein the first arm is a hollow first structure that is further defined with an inner diameter;
wherein the second arm is a second structure that is further defined with an outer diameter;
wherein the outer diameter of the second arm is less than the inner diameter of the first arm such that the third end of the second arm is configured to be inserted into the second end of the first arm in a telescopic manner;
wherein the position of the second arm relative to the first arm is held in position using the detent;
wherein the detent is a mechanical device that connects and secures the first arm to the second arm;
wherein the first arm is a perforated pipe;
wherein the second arm is a perforated pipe;
wherein the stand is a structure that supports the telescopic stanchion such that the center axis of the telescopic stanchion projects perpendicularly away from the supporting surface when the training device is positioned for use;
wherein the stand comprises a first strut, a second strut, a third strut, a fourth strut, and a retaining ring;
wherein the first strut, the second strut, the third strut, and the fourth strut is attached to the first arm;
wherein the first strut, the second strut, the third strut, and the fourth strut is attached to the retaining ring;
wherein the stand attaches to the first arm of the telescopic stanchion such that a sixth end of the first strut extends beyond the first end of the first arm in the inferior direction;
wherein the stand attaches to the first arm of the telescopic stanchion such that an eighth end of the second strut extends beyond the first end of the first arm in the inferior direction;
wherein the stand attaches to the first arm of the telescopic stanchion such that a tenth end of the third strut extends beyond the first end of the first arm in the inferior direction;
wherein the stand attaches to the first arm of the telescopic stanchion such that a twelfth end of the fourth strut extends beyond the first end of the first arm in the inferior direction;
wherein the radial hole is formed in the fourth end of the second arm;
wherein the first strut is a pipe;
wherein the second strut is a pipe;
wherein the third strut is a pipe;
wherein the fourth strut is a pipe;
wherein the first strut further comprises a first end cap;
wherein the second strut further comprises a second end cap;
wherein the third strut further comprises a third end cap;
wherein the fourth strut further comprises a fourth end cap;
wherein the retaining ring is a ring structure;
wherein the inner diameter of the retaining ring is greater than the outer diameter of the first arm such that the first arm is configured to be inserted through the retaining ring;
wherein the basket comprises a rectangular container;
wherein the rectangular container is a hollow rectangular block structure that is further defined with an open face, a basket length, and a basket width;
wherein the baton is placed into and removed from the basket through the open face;
wherein the open face is the superior face of the rectangular container;
wherein the basket length is the span of the rectangular container that is in a direction that is parallel to the center axis of the baton when the baton is properly placed within the rectangular container;
wherein the basket width is the span of the rectangular container that is in a direction that is perpendicular to the direction of the basket length
wherein the basket width is the span of the rectangular container that is in a direction that is parallel to the supporting surface.
2. The training device according to claim 1,
wherein the locking hinge is a fastening device;
wherein the locking hinge is a rotatable device.
3. The training device according to claim 2,
wherein the locking hinge comprises a first flange, a second flange, a pivot shaft, a first hole, a second hole, and a locking mechanism;
wherein the first flange and the second flange attach to the basket;
wherein the pivot attaches the first flange and the second flange to the second arm,
wherein the first hole is formed in the first flange;
wherein the second hole is formed in the second flange;
wherein the locking mechanism is a mechanical device that prevents the locking hinge from rotating;
wherein the locking hinge is further defined with a basket angle;
wherein the basket angle is an angular measure of a cant that is formed between the inferior surface of the rectangular container and the supporting surface;
wherein the basket angle is zero when the inferior surface of the rectangular container is parallel to the supporting surface;

wherein the pivot shaft is further defined with a thirteenth end and a fourteenth end;
wherein the first flange is a plate;
wherein the second flange is a plate;
wherein the pivot shaft is a cylindrical shaft;
wherein the first hole is a circular hole that is formed within the first flange;
wherein the second hole is a circular hole that is formed within the second flange;
wherein the locking hinge attaches the basket to the fourth end of the second arm of the telescopic stanchion.

4. The training device according to claim 3,
wherein the basket angle is adjusted by the locking hinge.

5. The training device according to claim 4,
wherein the first flange attaches to a face of the rectangular container that is distal to the open face of the rectangular container;
wherein the second flange attaches to the face of the rectangular container that is distal to the open face of the rectangular container;
wherein the first flange projects perpendicularly away from the rectangular container in the inferior direction;
wherein the second flange projects perpendicularly away from the rectangular container in the inferior direction;
wherein the span between the interior surface after assembly of the locking hinge of the first flange and the interior surface of the second flange is sized such that the second arm is configured to be inserted into the space between the first flange and the second flange.

6. The training device according to claim 5,
wherein the locking hinge attaches to the fourth end of the second arm;
wherein the second arm is inserted between the first flange and the second flange of the locking hinge such that the center axis of the radial hole of the second arm is aligned with the center of the first hole of the first flange and the center of the second hole of the second flange;
wherein the pivot shaft is simultaneously inserted through the first hole, the radial hole and the second hole such that the center axis of the pivot shaft is aligned with the center axis of the radial hole;
wherein the pivot shaft is simultaneously inserted through the first hole, the radial hole and the second hole such that the thirteenth end of the pivot shaft is proximal to the first hole;
wherein the pivot shaft is simultaneously inserted through the first hole, the radial hole and the second hole such that the fourteenth end of the pivot shaft is proximal to the first hole;
wherein with this arrangement, the locking hinge rotates around the pivot shaft such that the center axis of the radial hole forms the center of rotation;
wherein the rotation of the locking hinge around the pivot shaft allows for adjustment of the basket angle;
wherein the basket angle is locked into position by the locking mechanism;
wherein the locking mechanism prevents the rotation of the locking hinge.

7. The training device according to claim 6,
wherein a fifth end of the first strut attaches to the first arm of the telescopic stanchion;
wherein a seventh end of the second strut attaches to the first arm of the telescopic stanchion;
wherein a ninth end of the third strut attaches to the first arm of the telescopic stanchion;
wherein an eleventh end of the fourth strut attaches to the first arm of the telescopic stanchion;
wherein the first strut, the second strut, the third strut, and the fourth strut are reinforced using the retaining ring;
wherein a face of the first strut attaches to the retaining ring in a manner which fixes the position of the first strut relative to the position of the remaining struts within the stand;
wherein a face of the second strut attaches to the retaining ring in a manner which fixes the position of the second strut relative to the position of the remaining struts within the stand;
wherein a face of the third strut attaches to the retaining ring in a manner which fixes the position of the third strut relative to the position of the remaining struts within the stand;
wherein a face of the fourth strut attaches to the retaining ring in a manner which fixes the position of the fourth strut relative to the position of the remaining struts within the stand.

8. The training device according to claim 7,
wherein the first end cap is placed over the sixth end of the first strut;
wherein the second end cap is placed over the eighth end of the second strut;
wherein the third end cap is placed over the tenth end of the third strut;
wherein the fourth end cap is placed over the twelfth end of the fourth strut.

9. The training device according to claim 8, wherein the detent is selected from the group consisting of a cotter pin, a G snap collar, a cam lock collar, a threaded clutch, a split collar lock, or a spring loaded ball lock.

10. The training device according to claim 9, wherein the detent is a cotter pin that is simultaneously inserted through one of a plurality of perforations contained within the first arm and one of a plurality of perforations contained within the second arm.

* * * * *